(No Model.)
D. C. STOVER.
GRINDING MILL.
No. 430,899. Patented June 24, 1890.
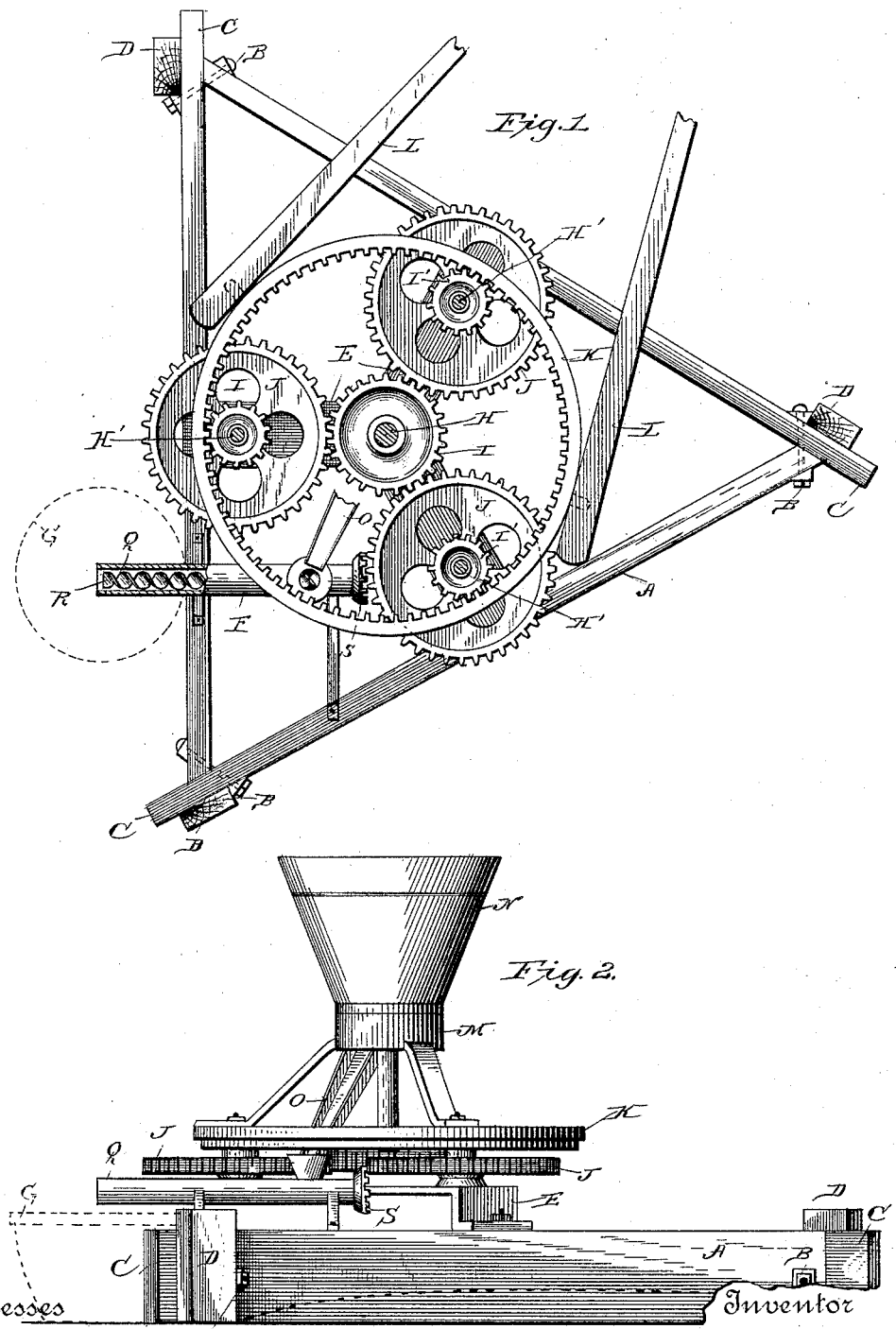
Witnesses
Harry S. Bohrer
Lee F. Moses
Inventor
Daniel C. Stover.
By his Attorneys
Wiles & Greene

UNITED STATES PATENT OFFICE.

DANIEL C. STOVER, OF FREEPORT, ILLINOIS, ASSIGNOR TO THE STOVER MANUFACTURING COMPANY, OF SAME PLACE.

GRINDING-MILL.

SPECIFICATION forming part of Letters Patent No. 430,899, dated June 24, 1890.

Application filed October 24, 1889. Serial No. 328,039. (No model.)

*To all whom it may concern:*

Be it known that I, DANIEL C. STOVER, a resident of Freeport, in the county of Stephenson and State of Illinois, have invented certain new and useful Improvements in Grinding-Mills; and I do hereby declare the following to be a full, clear, and exact description of the invention, such as will enable others skilled in the art to which it pertains to make and use the same.

My invention relates to improvements in grinding-mills such as are usually secured in position upon the ground and operated through a sweep by animals traveling in a circle about the mill. It involves the use of a peculiar frame for supporting the mill proper and a conveyer made necessary by the novel frame.

The invention is fully shown in the accompanying drawings, in which—

Figure 1 shows in plan the frame, conveyer, and the driving devices of a well-known geared mill, the grinding-cones and hopper being removed to expose the novel parts that lie beneath. Fig. 2 is a side elevation of the same parts with the parts omitted in Fig. 1 in proper position.

In the drawings, A is a frame in the form of an equilateral triangle. The ends of the planks from which it is formed are secured together by bolts B, the corresponding ends of each of the three pieces projecting beyond the contiguous pieces at C. The frame so formed is not provided with a bottom usually, as it is not intended to serve as a receptacle for meal, but simply for supporting and fixing the mill. For the latter purpose three stakes D are driven in the earth at such points that each may be in line with one of the sides at the end toward which the torsion of the power acts, and as this brings each of them adjacent to one of the bolts fastening the sides together contrary rotation of the frame is incidentally prevented. A suitable spider E rests upon the frame and supports the working parts of a geared sweep grinding-mill, for which no novelty is herein claimed, and also a screw conveyer R for conveying the meal to a point beyond the sides of the frame, where it may be received by a basket or other suitable receptacle G. The spider has at its center a vertical gudgeon H, upon which is mounted a pinion I and upon each of its arms a gudgeon H', upon which rotates a gear J, meshing with the pinion I. Upon the same gudgeons above the gears J are pinions I', rigidly connected with the gears J, and these are all engaged by an internally-geared master-wheel K, operated by the sweep L. The master-wheel supports the outer shell M and hopper N of a cone and shell mill. Within the shell is the usual cone (not shown) driven by the pinion I below. From the base of the shell and cone mechanism the meal is discharged through the usual spout O, which terminates a little below and within the master-wheel. The meal discharged by the spout falls into a small hopper and thence passes into a horizontal tube Q, supported from the frame and extending outward perpendicular, to one of the sides of the triangle, beyond which it projects to such a distance that the meal may be discharged directly over the middle of an ordinary basket or the like. Within the tube is a spiral conveyer R, driven by a crown-pinion S, in engagement with one of the gears J. The operation is evident.

Among the advantages secured by the triangular frame are compactness, cheapness, strength, durability, and stability upon uneven ground. It is common to make the mill-supporting frame quadrilateral. It then becomes necessary to use a strong bottom or otherwise carefully brace the structure to prevent its distortion, and since the bottom must in any event be used or replaced by braces it has been common to make the frame large and utilize it as a receptacle for meal, one of the vertical members of the frame being usually omitted to facilitate removal of the meal from the box; but when the bottom is used it becomes necessary to make the ground upon which it rests plane in order to secure stability, and the larger the box the greater this difficulty. Even if the bottom be omitted the point of support of the four corners must be in the same plane. With the triangular frame, on the other hand, this difficulty is almost entirely overcome, and, indeed, entirely obviated, if, as is sometimes done, we cut away each side of the frame, as indicated in dotted lines in Fig. 2. It is to be observed that in this frame the strain is much more nearly in line with the sides than when four or more sides are employed, and as the thrust is almost exclusively an end-thrust directly against the stake the frame may be made much lighter than in the common forms.

It is evident that the conveyer does not depend for its operation upon the particular arrangement of gears shown as a driving mechanism for the mill, but that it may be used, for example, if two of the gears J be omitted; and it is equally plain that the frame will equally resist the strain of the sweep upon the gearing if the mill proper be not located, as shown.

What I claim as new, and desire to secure by Letters Patent, is—

1. The combination of the frame composed of three pieces, the bolts securing said pieces together in triangular form and projecting to form stops for anchoring-stakes in the planes of said pieces, respectively, and the sweep grinding-mill mounted centrally upon said frame and secured to its upper edge, substantially as set forth.

2. The combination, with a sweep grinding-mill having at its base gears for transmitting motion to one of the grinding-burrs, of a horizontal conveyer-tube, a screw conveyer therein, and a pinion secured to the conveyer and meshing with one of said gears, and means for delivering meal from the mill to said conveyer.

3. The combination, with the triangular frame, a grinding-mill mounted upon said frame and provided at its base with gears for imparting motion to one of the grinding-burrs, of a screw conveyer also mounted upon said frame and actuated by a pinion meshing with one of said gears, substantially as set forth.

In testimony whereof I have signed this specification in the presence of two subscribing witnesses.

DANIEL C. STOVER.

Witnesses:
J. A. CRAIN,
I. G. GARNER.